March 1, 1927.

E. F. PAWSAT

TIRE REPAIR TOOL

Filed Sept. 29, 1926

1,619,538

Inventor,
Ewald F. Pawsat.
By Arthur H. Ewald,
Attorney.

Patented Mar. 1, 1927.

1,619,538

UNITED STATES PATENT OFFICE.

EWALD F. PAWSAT, OF MAYSVILLE, KENTUCKY, ASSIGNOR TO WALD MANUFACTURING COMPANY, A CORPORATION OF KENTUCKY.

TIRE-REPAIR TOOL.

Application filed September 29, 1926. Serial No. 138,524.

My invention relates to tire repair tools and has particular reference to the provision of a tool for the repair of punctures in a bicycle tire.

The principal object of the present invention is to provide a simple and efficient tool for the mending of punctures in bicycle tires.

A further object is to provide a tool of the character mentioned which may be manufactured and therefore sold at a minimum of expense or cost.

Further objects of the invention will appear from the following detailed description thereof.

Figure 1:
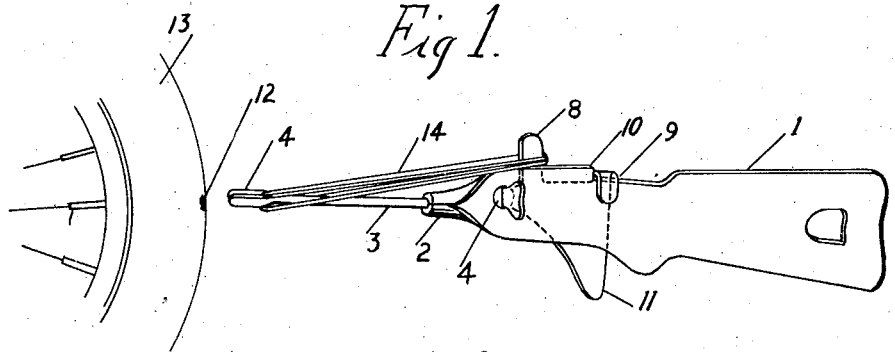
Figure 1 is a perspective of my new tire repair tool, showing the same ready for use.

The numeral 1 indicates a plate or handle by means of which my new tire repair tool is adapted to be conveniently gripped during use. The plate 1 is generally in the shape of a gun stock, and is preferably made of sheet metal of a suitable gauge from which it is formed by stamping by means of suitable dies. The front end of the plate 1 is turned over, as shown at 2, to form a socket to retain a rod or needle 3. The front end of the needle 3 is provided with a bifurcation 4 for the purpose hereinafter mentioned. The plate 1, a short distance to the rear of the socket 2, is provided with a perforation 4.

Adapted to be mounted on the handle plate 1 is a trigger plate 5, said plate being also stamped from sheet metal similar to that from which the plate 1 is formed by means of a suitable die. The plate 5 is provided with a right-angled extension 6 adapted to extend through the perforation 4 of the plate 1, the end of said extension being bent, as shown at 7, to prevent removal of the plate from the perforation after insertion. When so mounted, the plate 5 is adapted to rotary movement with respect to the plate 1, and also to slight linear movements with respect thereto, the bearing of the extension 6 in the perforation 4 being very loose. The upperside of the plate 5 is provided with an upright extension 8, and an overturned extension or dog 9, the latter being adapted to engage behind a shoulder 10 on the plate 1. When the dog 9 is in engagement behind the shoulder 10 the extension 8 extends upwardly above the edge of plate 1, as shown in Figure 1 of the drawings. The lower end of the plate 5 is arranged to form a trigger 11.

Figure 2:
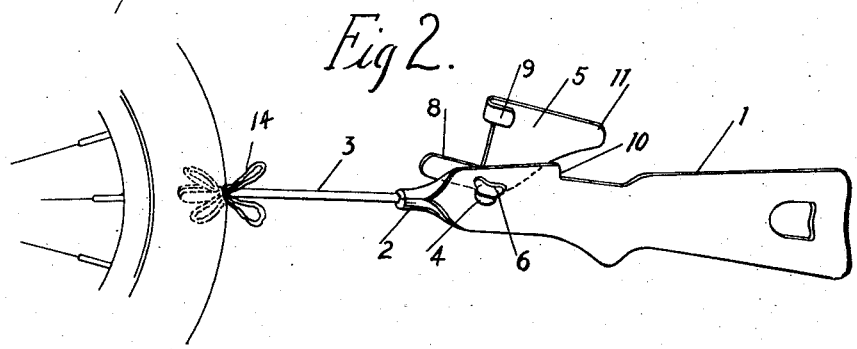
Figure 2 is a similar view illustrating the use of said tool.
Figure 3:
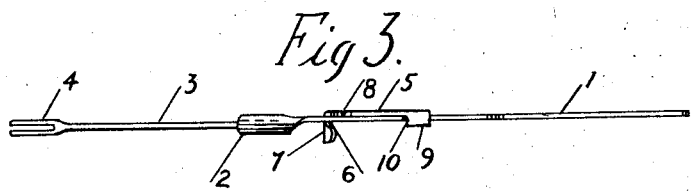
Figure 3 is a top view of the tool.

The operation of my new tire repair tool is as follows: When it is desired to repair a puncture or hole 12 in the tire 13, a rubber band or plurality of rubber bands 14 are placed in the tire repair tool, as shown in Figure 1; that is, the intermediate sections of the band loops are placed in the bifurcation 4 of the needle 3 and the ends of said rubber band or rubber bands are looped over the extension 8 of the plate 5. The trigger end of plate 5 is then turned downwardly to the position shown in Figure 1, wherein the dog 9 rests against the shoulder 10 of the plate 1. The tension of the band or bands 14 locks the plate 5 in such position by reason of the abutment of the dog 9 against the shoulder 10, the normal angle of tension of the band or bands 14 being in approximate alignment with such abutment. The rubber band or bands having been provided with a quantity of rubber cement, the end of the needle is inserted in the puncture, as shown in Figure 2. The operator then draws backwardly with his finger against the trigger 11. This action raises the dog 9 beyond the shoulder 10 whereupon the tension of the rubber band or bands snaps the plate 5 forwardly to the position shown in Figure 2, thus releasing the rubber band or bands, as also shown in Figure 2. The needle is then withdrawn from the puncture, leaving the bands therein to serve as a filler and repair therefor. If desired, of course, the outer ends of the band or bands may be trimmed even with the surface of the tire.

It will be seen that in the construction above described I have provided a repair tool which may be manufactured at an extremely low cost, all of the parts being stamped from inexpensive materials so that the time expended in the various operations is reduced to a minimum.

Having thus fully described my invention, what I claim as new and desire to secure by Letters Patent is:

1. A tire repair tool, comprising a handle plate, a needle having a bifurcated end secured in one end of said handle plate, a trigger plate rotatably mounted on said handle plate, holding means on said trigger plate for a resilient band, interlocking means between said handle and trigger plates, said interlocking means being maintained in effective engagement by tension between the bifurcation on said handle plate and said holding means.

2. A tire repair tool, comprising a handle plate, a needle having a bifurcated end secured in one end of said handle plate, a trigger plate rotatably mounted on said handle plate, an upward extension on said trigger plate arranged to receive one end of a resilient band, and interlocking means between said handle and trigger plates, said interlocking means being maintained in effective engagement by tension between the bifurcation of said needle and said holding means.

3. A tire repair tool, comprising a handle plate, a needle having a bifurcated end secured in one end of said handle plate, a trigger plate rotatably mounted on said handle plate, holding means on said trigger plate for a resilient band, a shoulder on said handle plate, and a dog on said trigger plate arranged to engage said shoulder plate so as to interlock said handle and trigger plates.

4. A tire repair tool, comprising a handle plate, a needle having a bifurcated end secured in one end of said handle plate, a trigger plate rotatably mounted on said handle plate, holding means on said trigger plate for a resilient band, a shoulder on said handle plate, and a dog on said trigger plate arranged to engage said shoulder plate so as to interlock said handle and trigger plates, said dog being maintained in effective engagement with said shoulder by tension between the bifurcation of said needle and said holding means.

5. A tire repair tool, comprising a handle plate, a needle having a bifurcated end secured in one end of said handle plate, a trigger plate rotatably mounted on said handle plate, an upward extension on said trigger plate arranged to receive one end of a resilient band, a shoulder on said handle plate, and a dog on said trigger plate arranged to engage said shoulder plate so as to interlock said handle and trigger plates.

6. A tire repair tool, comprising a handle plate, a needle having a bifurcated end secured in one end of said handle plate, a trigger plate rotatably mounted on said handle plate, an upward extension on said trigger plate arranged to receive one end of a resilient band, a shoulder on said handle plate, and a dog on said trigger plate arranged to engage said shoulder plate so as to interlock said handle and trigger plates, said dog being maintained in effective engagement with said shoulder by tension between the bifurcation of said needle and said holding means.

7. A tire repair tool, comprising a handle plate, one end of said handle plate being provided with a socket, a needle secured in said socket, the free end of said needle being bifurcated, a trigger plate rotatably mounted in a perforation in said handle plate, holding means on said trigger plate for a resilient band, and interlocking means between said handle and trigger plates.

8. A tire repair tool, comprising a handle plate, one end of said handle plate being provided with a socket, a needle secured in said socket, the free end of said needle being bifurcated, a trigger plate rotatably mounted in a perforation in said handle plate, holding means on said trigger plate for a resilient band, and interlocking means between said handle and trigger plates, said interlocking means being maintained in effective engagement by tension between the bifurcated end of said needle and said holding means.

9. A tire repair tool, comprising a handle plate, one end of said handle plate being provided with a socket, a needle secured in said socket, the free end of said needle being bifurcated, a trigger plate rotatably mounted in a perforation in said handle plate, an upward extension on said trigger plate arranged to receive one end of said resilient band, and interlocking means between said handle and trigger plates, said interlocking means being maintained in effective engagement by tension between the bifurcated end of said needle and said extension on said trigger plate.

EWALD F. PAWSAT.